Patented Mar. 12, 1929.

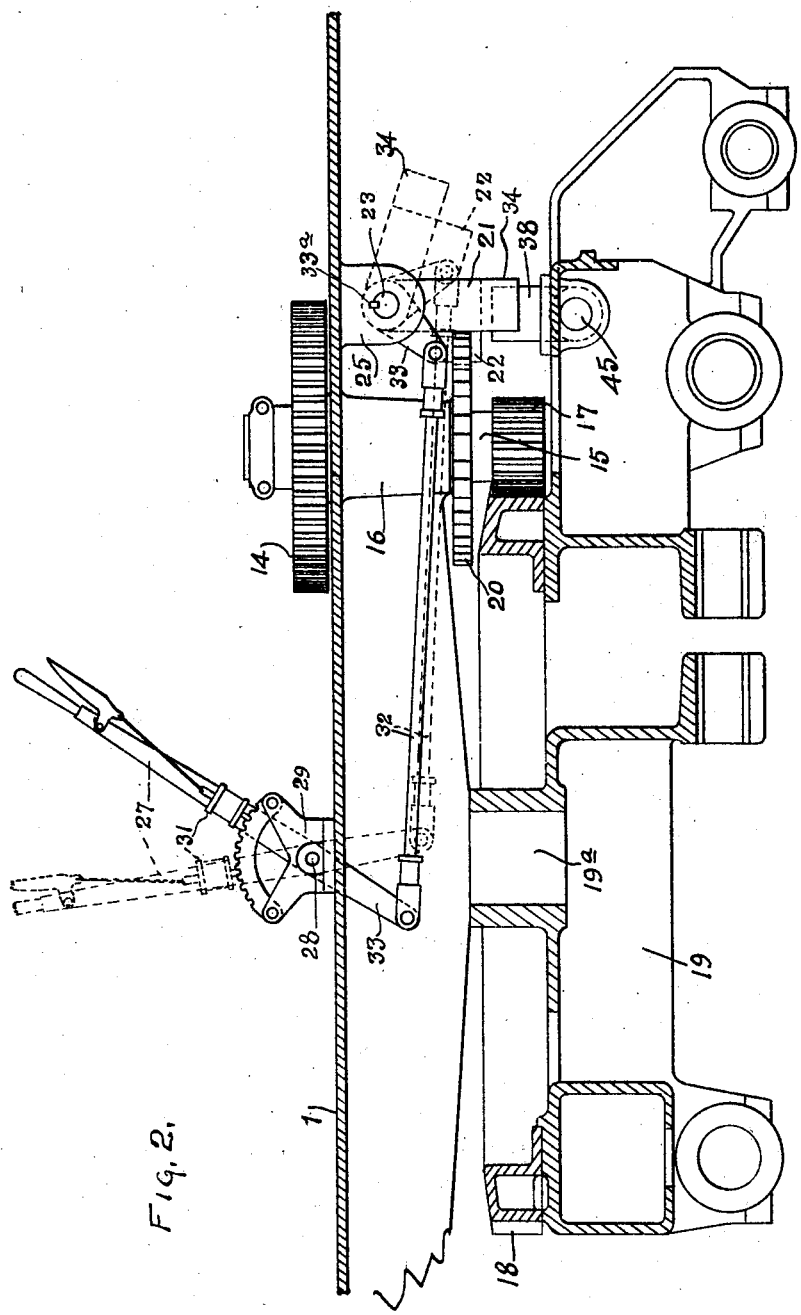

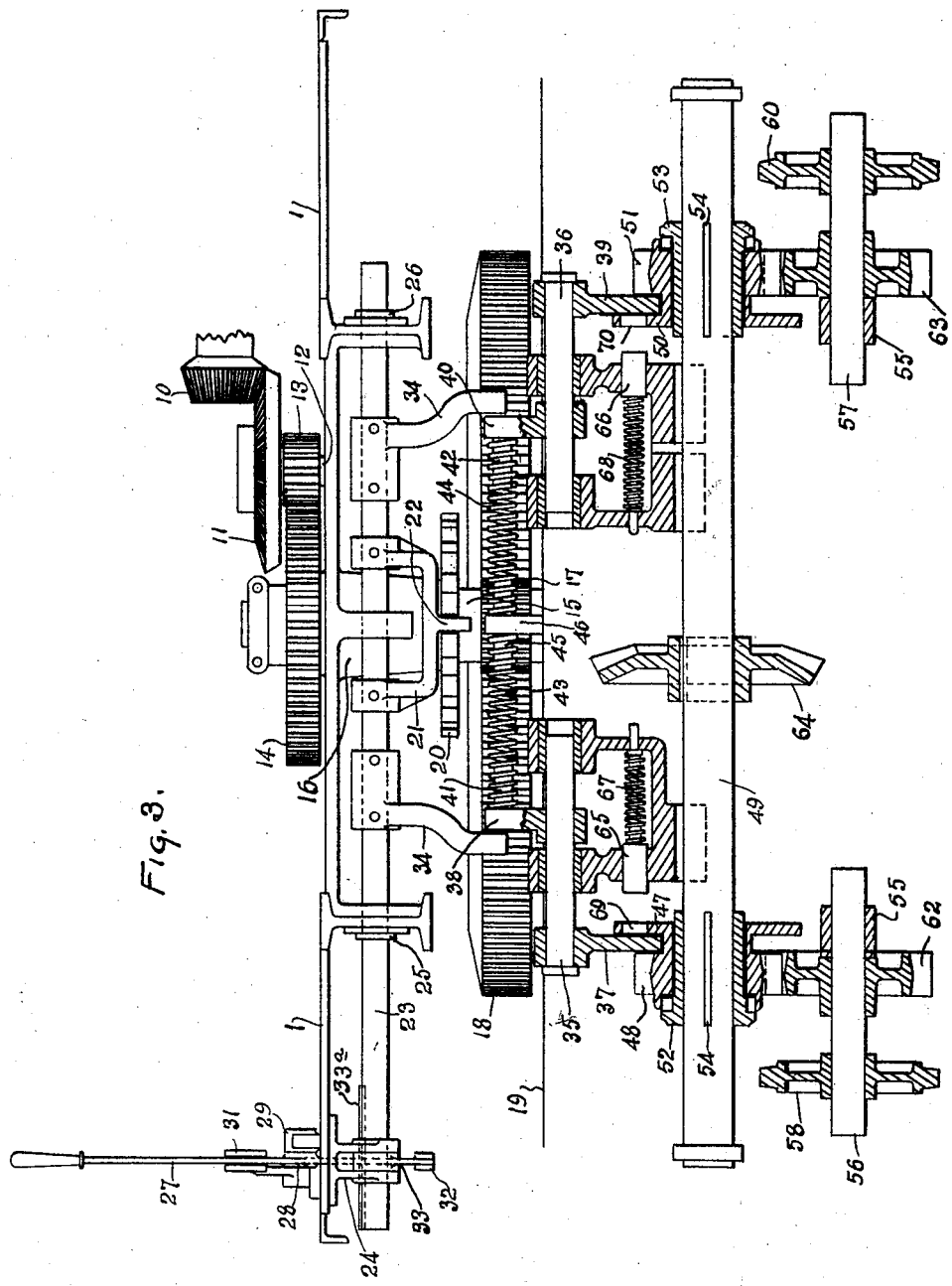

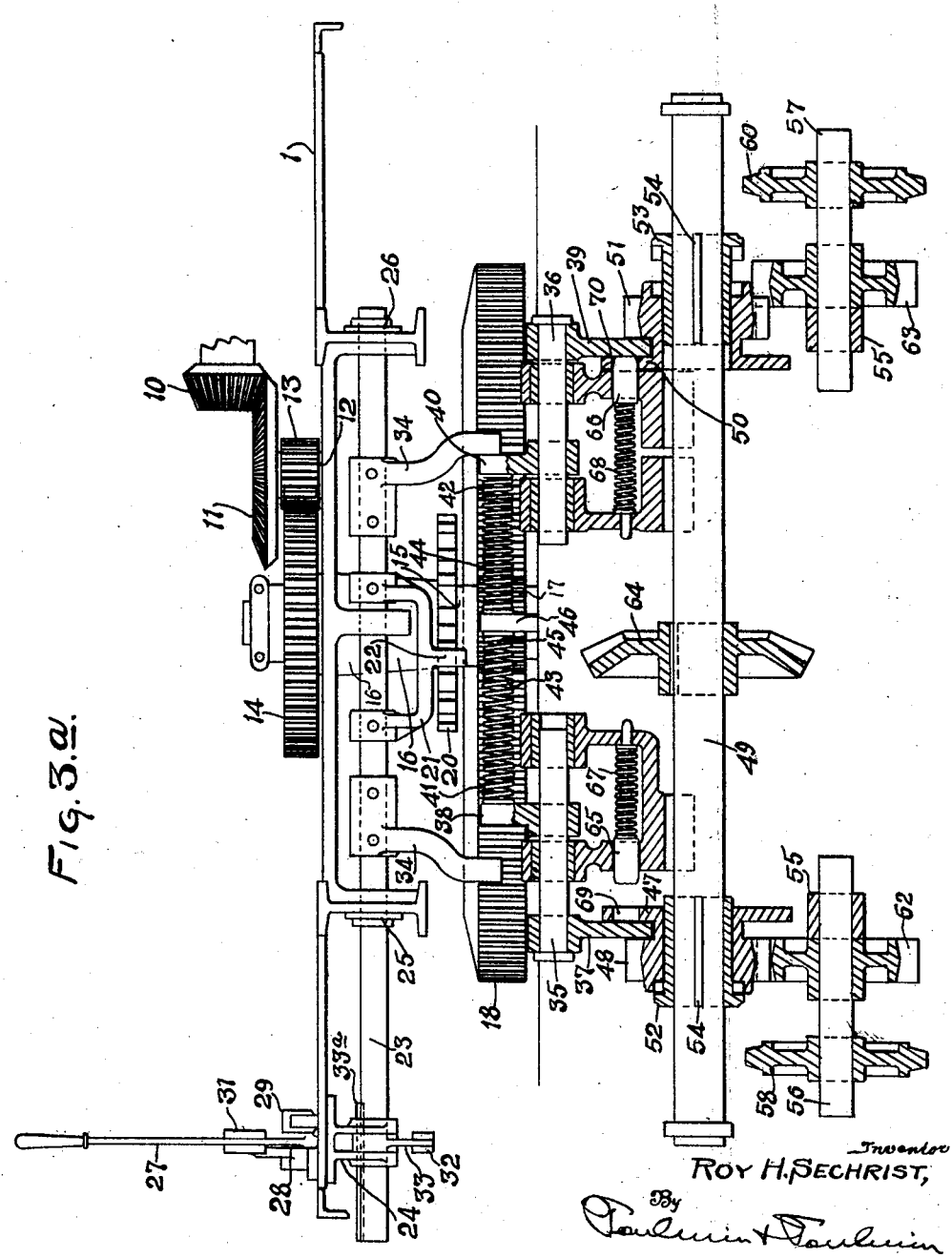

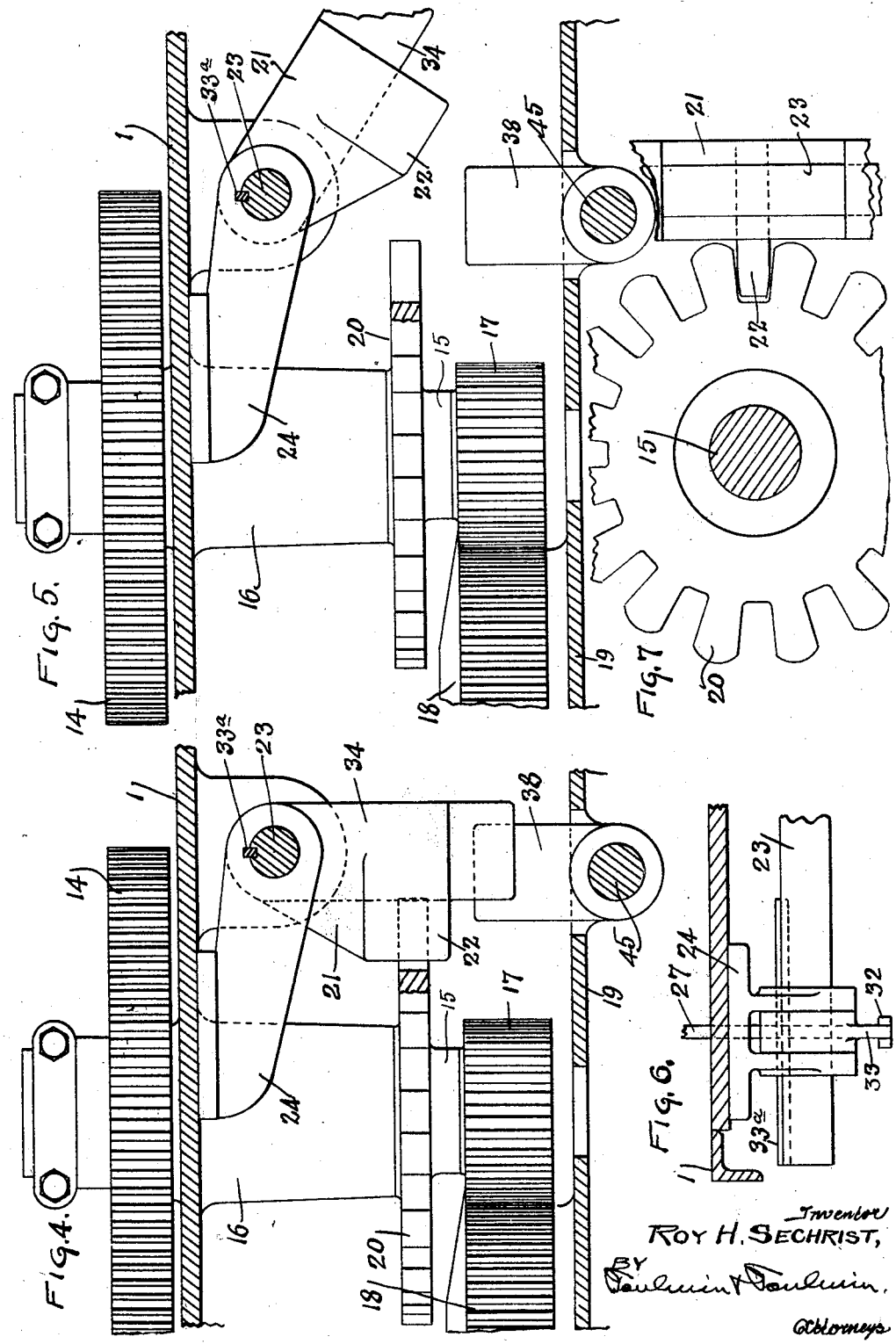

1,705,269

UNITED STATES PATENT OFFICE.

ROY H. SECHRIST, OF MARION, OHIO, ASSIGNOR TO THE MARION STEAM SHOVEL COMPANY, OF MARION, OHIO, A CORPORATION OF OHIO.

STEERING MECHANISM FOR POWER SHOVELS.

Application filed May 31, 1927. Serial No. 195,397.

This invention relates to steering mechanism for power shovels of the so-called creeping tractor type, meaning such shovels as are mounted on endless traction belts, though the invention is applicable to power shovels mounted on ground wheels of which some are propulsion or traction wheels.

The present invention is in the nature of an improvement on the invention set forth in the application of Dwight J. Shelton, Serial No. 149,616, filed in the United States Patent Office, November 20, 1926, relating to steering mechanism for power shovels.

As in the case of the invention of said Shelton, set forth in said application, so also this invention of mine utilizes a three-branch steering mechanism, namely, an actuating branch, a positioning branch and an actuated branch; the actuating branch being adapted to operate the actuated branch when the positioning branch shall have been adjusted to form a connection between the actuating and the actuated branches. But in said Shelton invention there is included or utilized a special actuating motor or engine aside from either the power unit by which the platform of the machine is swung from side to side, or that by which the machine may be propelled; while in my invention now being set forth, I utilize the power unit for so swinging the platform by the addition of certain actuating mechanism, whose mode of operation and function have no relation to swinging the platform, but are solely confined to the function of operating the actuated branch by which the propelling mechanism of the machine may be allowed to propel the belts or wheels on one side or the other of the machine to steer the machine to the right or the left.

This added feature of the actuating mechanism, in the preferred embodiment set forth and illustrated herein, is in the nature of a sprocket or gear which, although it receives motion from the shaft whose pinion meshes with the toothed rack for swinging the platform, itself has no function with reference to swinging the platform.

In the accompanying drawings forming a part of the specification,

Figure 2 is an enlarged longitudinal vertical sectional view taken on the line 2—2 of Figure 1, showing some of the parts also in elevation, and illustrating particularly the added features to the common actuating mechanism branch, some of the actuated mechanism branch and the positioning mechanism branch;

Figure 3 is a partial end view and transverse sectional view showing the added devices of the actuating branch, the actuated branch and the positioning branch;

Figure 1:
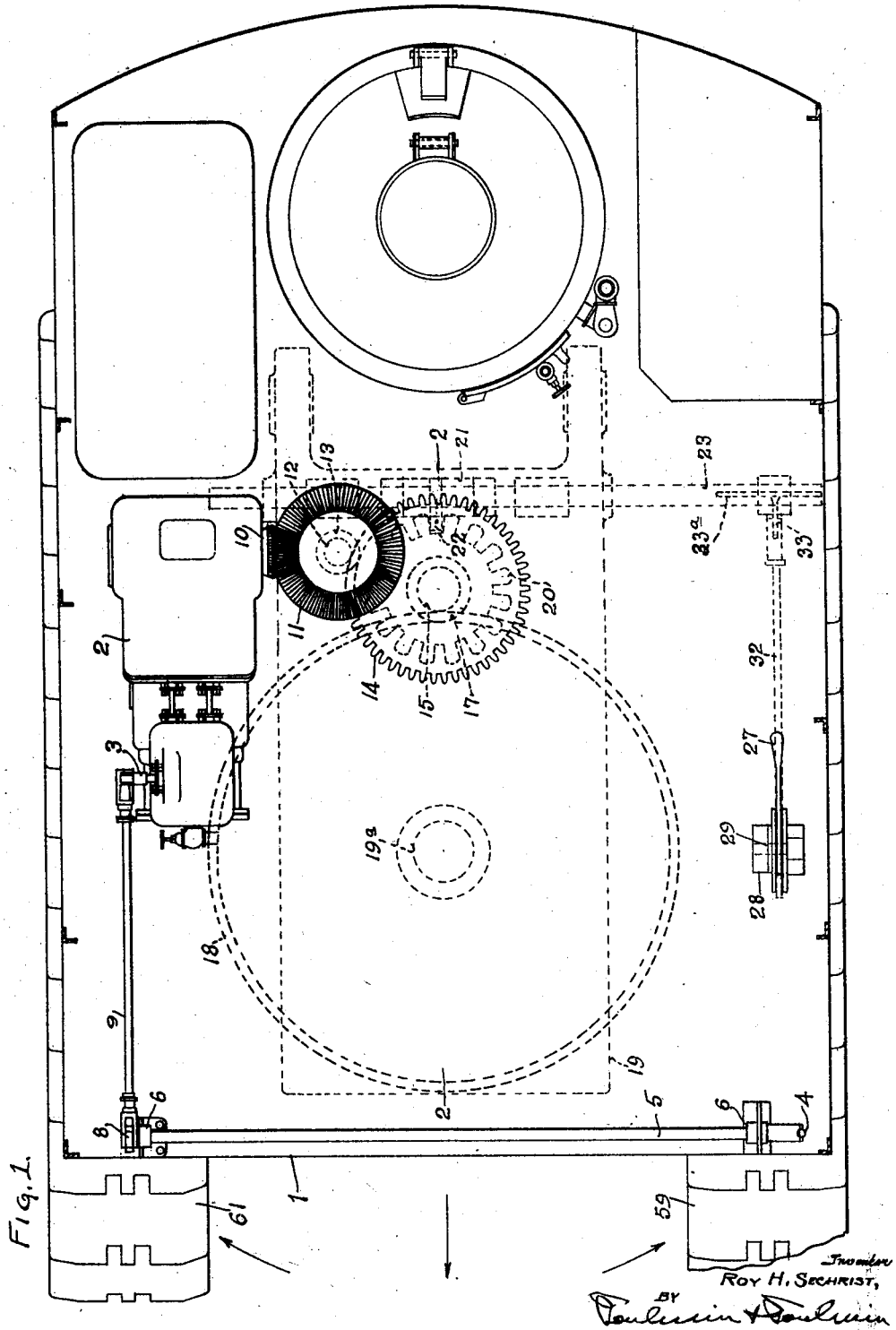
Figure 1 is a plan view of so much of a swinging power shovel as is necessary to illustrate my invention, the added feature of the actuating mechanism being shown in relation to the other parts in said figure.

Figure 3ª is a like view to Figure 3, except that in Figure 3ª, the right hand clutch members have been disengaged while the left hand clutch members remain in engagement, in which position the machine may be steered to one side when power is applied.

Figure 4 is a partial side elevation and sectional view essentially of the added mechanism of the actuating branch, of the positioning branch and of the actuated branch, showing the parts positioned to operate the actuated branch;

Figure 5 is a like view showing the parts positioned so as not to operate the actuated branch;

Figure 6 is a detail view showing particularly the mounting to the rock shaft of the positioning mechanism, the operating arm thereof and the pitman for operating the said arm;

Figure 7 is a detail plan view of a part of the gear or sprocket added to the actuating mechanism and of the rock shaft and locking arm of the positioning branch.

The numeral 1 designates a conventional swinging platform of the conventional power shovel or excavator. This platform carries the usual superstructure of such a machine, including the power unit and the gearing by which the machine is propelled by the transmission of power to the ground wheels or traction belts and by which also the platform is rotated or swung from side to side in the operation of digging or for other purposes. This platform is also, as usual, mounted on what is known as a toothed rack in such wise that when the swinging mechanism is operated it rotates or swings the platform. Such rack is supported by the truck frame which itself is mounted on the ground wheels or traction belts and their adjuncts. See Figure 2 in this connection.

To the platform-revolving power unit, and its adjuncts, which I denominate in this specification as the actuating branch of the mechanism, I have added and combined my supplemental actuating devices whose function, as before stated, is to actuate the actuated branch when the positioning branch is positioned for that purpose.

With this explanation I proceed to describe the actuating branch, including the supplemental actuating devices.

On the platform 1 is mounted a reversible engine 2 operated by steam or other motive agent, as compressed air. This engine has valve mechanism indicated generally at 3 by which the motive agent is admitted to one end or the other of the cylinder to cause the piston to reciprocate in one direction or the other. This valve mechanism is controlled by an operator occupying a position near the lever indicated at 4 in Figure 1. This lever is mounted on a rock shaft 5 carried in bearings 6 supported by the platform. At the other end the shaft is equipped with an arm 8 which operates a rod 9 connected to the valve devices 3 to properly position the valve for forward or reverse strokes of the pistons.

The engine shaft carries a beveled pinion 10 which meshes with a beveled gear 11 loosely mounted on a stub shaft 12 carried by the platform. A pinion 13 is secured to the beveled gear 11 so that it will rotate and operate a gear wheel 14 itself mounted on a shaft 15 which extends through a bearing 16 carried by the platform 1. The lower end of the shaft 15 is provided with a pinion 17 which meshes with a stationary toothed rack 18 by which the platform is rotated or swung from side to side, being mounted on a trunnion 19$^a$.

This stationary toothed rack is supported in the conventional way on the truck frame generally indicated at 19 in Figure 2.

What I have so far described is conventional in this class of machines. I shall now set forth my supplemental actuating devices. These consist in the present embodiment of the gear or sprocket wheel 20 secured to the shaft 15 at a point below the platform so as to be rotated by the engine or motor through the gearing above described. See Figures 1 and 2 in particular.

This actuating gear or sprocket 20 is designed to receive a yoke 21 having a projection 22 designed to enter between the teeth or sprockets thereof. See Figure 3.

This yoke forms a part of the positioning branch of the mechanism and is mounted fixedly on a rock shaft 23 supported in bearings 24, 25 and 26, attached to the bottom of the platform 1. This shaft is actuated by a hand lever 27 fulcrumed at 28 in a bearing 29 secured to the platform.

A toothed segment in conjunction with the latch 31 of the lever enables the operator to secure the lever in any fixed position. The lower end of the lever connects by a rod 32 to an arm 33 on the rock shaft 23 keyed on the shaft by a spline 33$^a$ as seen in Figure 2. The spline connects the arm and rock shaft together rotatively but allows the shaft to be reciprocated within the arm.

The bearing 24 is bifurcated as seen in Figure 3 and the arm 33 is positioned within the bifurcation to prevent the arm from having longitudinal movement when the rock shaft 23 is reciprocated in the manner presently to be stated. On the rock shaft I further mount and secure pressure arms 34 which reciprocate or move laterally back and forth with the rock shaft 23 and which, when that shaft is rocked to interlock the yoke 21 with the gear or sprocket 20, will be positioned in a manner to cause the clutch mechanism to be actuated, so as to unclutch one clutch device and allow the other to remain clutched, whereby the traction belt on one side will idle and that on the other will travel to effect turning.

It will now be understood that when the engine or motor is operated it will cause the cab to be rotated or swung from side to side when that is desired without in any wise affecting the steering mechanism; but that if the operator desires to steer the machine to one side or the other, he will position the positioning branch to bring the yoke 21 in locked relation to the gear or sprocket 20, so that the rotary motion of the gear or sprocket 20 received from the engine or motor will cause the gear or sprocket to reciprocate the rock shaft 23 and move the pressure arms 34 in a lateral direction, one way or the other according to in which direction the engine or motor is operated; and that thus the clutches of the actuated or traction branch of the mechanism will be adjusted to allow one or the other of the traction belts to receive power and by such power be made to rotate or travel to cause the machine to be steered toward one side or the other.

It will further be observed that though this steering is thus effected by the same engine or motor used to swing the cab or platform and in part by the gear operated by the engine for that purpose, still that in so far as steering is concerned the supplemental actuating devices must be utilized, and that those devices have no functional relation to the swinging of the platform, and that the swinging of the platform does not enter into the function of steering.

It is true, however, that the rotation of the actuating shaft 15 when utilized for steering purposes does, incidentally, but without functional result, give a slight movement to the platform because the swinging pinion 17 which meshes with the circular rack 18, is, in the example illustrated of the invention here in question, mounted on this same shaft 15 as a matter of economy to save cost of providing a separate similar shaft for the mounting and rotation of the steering sprocket or gear 20.

I will now refer to the actuated branch of the general mechanism. This branch is best seen in Figure 3. In the truck frame 19 are mounted two slidable shafts 35 and 36, having, respectively, arms 37 and 38 and arms 39 and 40. The arms 38 and 40 carry stud shafts 41 and 42, respectively, on which are mounted springs 43 and 44 respectively. The other ends of these springs are supported by studs 45 sustained by a standard 46 supported by the general truck frame.

It will now be seen that when the shaft 23 is given longitudinal movement through the action of the gear or sprocket 20 and the yoke 21, one of the pressure arms 34 (according to in which direction the shaft is moved) will act on the arm 38 or 40 as the case may be; and that in turn the shafts 35 and 36 will be moved longitudinally so that one or the other of the arms 37 or 39 will actuate the clutch to which it is connected.

The arm 37 engages the clutch 47 formed on the pinion 48, while the arm 39 engages the clutch 50 on the pinion 51. The other member of these clutches is shown at 52 and 53 respectively, and both of these clutch members are keyed by splines 54 to the driven shaft 49, while the pinion 51 is mounted on the clutch member 53.

The truck frame further carries bearings 55 in which are mounted shafts 56 and 57, respectively. The shaft 56 carries a sprocket wheel 58 utilized in driving one of the traction belts shown generally at 59 in Figure 1; while the shaft 57 carries a similar sprocket wheel 60 utilized in driving the other traction belt shown generally at 61 in Figure 1. In order to impart rotary motion to these shafts 56 and 57 the former has a gear wheel 62 which meshes with the pinion 48 and the other a gear wheel 63 which meshes with the pinion 51.

When the parts are in the position shown in Figure 3, both gears 62 and 63 are in mesh with their respective pinions 48 and 51, in which position the machine would travel straight ahead. But when the positioning shaft 23 has been partially rotated by the lever 27 to bring the yoke 21 in engagement with the gear or sprocket 20 and to bring the pressure arms 34 opposite the respective arms 38 and 40, and the sprocket or gear 20 is rotated by the motor or engine, in the manner before described, then if the resulting movement of the shaft 23 is to the left as viewed in Figure 3, the right hand arm 34 will move the arm 40 to the left, and thus unclutch the clutch 50 from the member 53 which will cause the pinion 51 to idle and, therefore, the shaft 57 with its sprocket 60 and traction belt to idle, while on the other hand the clutch 47 will be in engagement with the member 52 through the expansive action of the spring 43, and thereby cause the shaft 56 and its sprocket 58 to be rotated when power is applied to shaft 49 so that the traction belt on that side will travel and thus steer the machine to the right as in that case the traction belt 59 will be traveling and the traction belt 61 as seen in Figure 1 will be idling.

A driven gear 64 is shown on the shaft 49. This gear receives rotary motion from the driving engine in the usual way. It will be noted that there are also mounted in the truck frame two spring actuated pins 65 and 66 each being urged outward by its spring 67 and 68. It will further be noted that the pinion 48 has an opening 69 to fit over the pin 65 while the pinion 51 has a similar opening 70 to fit over the pin 66.

The purpose of this arrangement is that of locking the one or the other of these pinions, 48 or 51, against rotation while leaving the other free to rotate, as required when the machine is to be driven in a curved path or to make a turn.

In Figure 2 I have shown the lever 27 of the positioning branch of the mechanism in dotted lines, which is the position it occupies when the steering mechanism is inoperative, as when the yoke 21 and the pressure arms 34 are elevated as shown in Figure 5. But when the lever 27 is in the position shown in full lines in Figure 2, then the yoke 21 and the pressure arm 34 are in the position shown in Figure 4, or what may be called steering position.

Thus it will be understood that a power shovel or excavating machine having my invention applied thereto may be driven straight ahead, or may be steered from side to side by utilizing the power of the same engine or motor designed to supply the power to rotate or swing the platform or cab, but at a time when the swinging of the cab or platform is not to be accomplished, as that movement will be interfered with or prevented when the positioning branch is in the position necessary for steering, at which time the yoke 21 is in engagement with the gear or sprocket 20. The swinging of the cab is done when that engagement is broken, and steering is done when that engagement is effected.

At one time, when the cab is to be swung, the power from the swinging engine or motor is devoted to that purpose. When steering is to be done the power of that engine is also to be utilized but through a different ultimate source of distribution, namely, through the gear or sprocket 20, the yoke 21 and the pressure arms 34 acting on the clutch mechanism.

While the prime mover consisting of the engine or motor, generally indicated at 2 in the drawings, is a prime mover utilized for rotating or swinging from side to side the platform of the machine, and while I prefer to utilize that prime mover in effecting my steering operations, it is to be understood that the prime mover used by me for my said steering operations may be the same prime mover that will be utilized for propelling the machine; or may be used for other purposes. And it is further to be understood that in so far as concerns the prime mover utilized for steering purposes, I may use one confined to steering purposes alone when combined with my organization for effecting the steering of the machine.

Accordingly, where the term swinging engine or motor is used in this specification and the appended claims, it is to be understood as including what is just above stated with respect to the prime mover utilized in connection with the steering device herein set forth.

I would further observe, as seen in Figure 3ª, that when one of the clutched pinions is out of mesh or clutched connection with its associate member and the other clutch pinion is in engagement with its locking pin (65 or 66 as the case may be), then that traction belt (or traction wheel, as the case may be) which is associated with the locked pinion will itself be locked. This results in one traction belt (or traction wheel) being locked against travel or rotation while the other is being driven or rotated. Thus the steering movement imparted to the machine is carried into effect through the traveling or rotating belt or wheel on the one side of the machine while at the other side the belt or wheel is locked to prevent that side of the machine from receiving forward propulsion or tending to keep up with the motion or speed of the opposite side. By thus locking one of the belts or wheels, while the other belt or wheel is in motion, my steering mechanism here described becomes much more effective when turning the machine or deflecting it to one side, which can then be done more rapidly and in a shorter distance.

There is, therefore, a co-relation between this steering mechanism and these locking pins for locking one or the other of the clutched pinions.

It will be understood that I desire to comprehend within my invention such modifications as may be necessary to adapt it to varying conditions and uses.

Having thus fully described my invention, what I claim as new and desire to secure by Letters Patent, is:

1. In a power shovel, the combination of an actuating branch comprising the swinging engine or motor and gearing operated thereby, including a supplemental device, of an actuated branch comprising a truck frame, with traction devices and means to convey motion thereto including clutches, and a positioning branch comprising rotary and sliding means which in one position will actuate one or the other of the clutches through motion acquired from said swinging motor or engine gearing through said supplemental device.

2. In a power shovel, the combination with an actuating branch comprising a swinging motor and a chain of gearing operated thereby including a sprocket driven by such gearing, of an actuated branch comprising a truck frame having traction belts and driving devices therefor including a pair of clutches, and positioning mechanism comprising a yoke and lever connections to engage it with said sprocket, a shaft operable by said yoke and arms carried by said shaft adapted through intermediate devices to close one clutch and open the other.

3. In a power shovel, the combination with actuating mechanism comprising a platform, a swinging motor or engine mounted thereon, a chain of gearing operated thereby and a supplemental sprocket operated by said gearing, of an actuated branch comprising a truck frame, traction means on which the frame is mounted, clutches and devices to open one clutch and close the other, and a positioning branch comprising a lever operated rock shaft, a yoke and pressure arms on the shaft, the yoke being adapted to engage with said supplemental gear or sprocket and the arms to engage and disengage with and from the clutch operating devices.

4. In a power shovel, the combination with a platform, a swinging engine mounted thereon, a chain of gearing operated by said engine to furnish steering power at another time including a sprocket, of a truck frame and traction means on which it is mounted, driven mechanism to transmit power to the belts including clutches and devices to open one clutch and close the other, and a lever operated rock shaft slidably mounted in the platform, a yoke and pressure arms on said shaft, the yoke adapted to engage with said sprocket and the arms to open one clutch and close the other when said shaft is moved longitudinally by the gear or sprocket and yoke.

5. In a power shovel, the combination with an engine and its gearing, of a supplemental actuating device adapted to furnish motion for steering purposes, and positioning devices including a rotary and slidable member adapted to engage said supplemental actuating device to receive motion therefrom and also adapted to open and close clutches.

6. In a power shovel, the combination with a platform, a swinging engine mounted thereon and gearing for said engine, of a supplemental sprocket or gear mounted on a shaft of said gearing and adapted to furnish movement for steering purposes, a pair of clutches, and positioning devices consisting of a rock shaft slidably mounted in the platform and having a yoke and pressure arms, the yoke adapted to engage said sprocket, said arms to open one clutch and close the other.

7. In a power shovel, the combination with a train of power gearing, of a supplemental actuating sprocket operated by said gearing, a pair of clutches, and a rock shaft adapted to slide either way, a yoke secured to said shaft and adapted to engage with and disengage from said sprocket and pressure arms on said shaft adapted to open one clutch and close the other.

8. In a power shovel, the combination with a swinging platform, a swinging engine mounted thereon, gear to cause the engine to swing the platform at times and a supplemental gear operable by said train of gearing to steer the machine at other times, of a traction truck having traction mechanism and means to drive the same including clutches, and positioning mechanism including a rockshaft having arms thereon carried by the platform and adapted to engage said supplemental gear and to open one clutch and close the other, whereby the machine will have a dual operation consisting in swinging the platform at times and in steering the machine at other times, both through the same source of power.

9. In a power shovel, the combination of an actuated branch comprising a prime mover and gearing operated thereby, including a supplemental device, of an actuated branch comprising a truck frame with traction devices and means to convey motion thereto, including clutches and locking devices for the clutches, and a positioning-branch including a slidable rockshaft having means which in one position will actuate one or the other of the clutches through motion acquired from said prime mover and gearing through said supplemental device, while the other of said clutches is locked by said locking device.

10. In a power shovel, the combination of an actuating branch comprising a prime mover and gearing operated thereby, including a supplemental sprocket, of an actuated branch comprising a truck frame, traction devices and means to convey motion thereto including clutches, clutch-locking devices in the nature of spring-actuated pins adapted to engage the clutches, and a positioning branch comprising means which when in engagement with said supplemental sprocket will actuate one or the other of the clutches through motion acquired from said prime mover, while the other of said clutches is locked by said locking device.

In testimony whereof, I affix my signature.

ROY H. SECHRIST.